US010549652B2

(12) United States Patent
Deguchi et al.

(10) Patent No.: US 10,549,652 B2
(45) Date of Patent: Feb. 4, 2020

(54) POWER TRANSMISSION DEVICE

(71) Applicant: PANASONIC INTELLECTUAL PROPERTY MANAGEMENT CO., LTD., Osaka (JP)

(72) Inventors: Futoshi Deguchi, Fukuoka (JP); Yoshio Koyanagi, Kanagawa (JP); Kazuhiro Eguchi, Fukuoka (JP); Katsuya Okamoto, Fukuoka (JP); Ryosuke Hasaba, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 15/746,327

(22) PCT Filed: May 27, 2016

(86) PCT No.: PCT/JP2016/002600
§ 371 (c)(1),
(2) Date: Jan. 19, 2018

(87) PCT Pub. No.: WO2017/013825
PCT Pub. Date: Jan. 26, 2017

(65) Prior Publication Data
US 2018/0215277 A1 Aug. 2, 2018

(30) Foreign Application Priority Data
Jul. 21, 2015 (JP) .................... 2015-144090

(51) Int. Cl.
*B60L 53/31* (2019.01)
*H02J 50/12* (2016.01)
(Continued)

(52) U.S. Cl.
CPC .............. *B60L 53/31* (2019.02); *H02J 50/12* (2016.02); *H02J 50/50* (2016.02);
(Continued)

(58) Field of Classification Search
CPC .. H02J 50/12; H02J 50/50; H02J 7/025; H02J 50/40; B63G 8/001; B63H 19/00;
(Continued)

(56) References Cited

U.S. PATENT DOCUMENTS 5,301,096 A * 4/1994 Klontz .................... H01F 38/14
363/37
7,227,504 B2 6/2007 Deguchi et al.
(Continued)

FOREIGN PATENT DOCUMENTS

JP 2004-96182 A 3/2004
JP 2005/102101 A 4/2005
(Continued)

OTHER PUBLICATIONS

Notice of Reasons for Refusal, dated Jan. 8, 2019, for Japanese Application No. 2015-144090, 7 pages (with machine generated English translation).
(Continued)

*Primary Examiner* — Alfonso Perez Borroto
*Assistant Examiner* — Esayas G Yeshaw
(74) *Attorney, Agent, or Firm* — Seed IP Law Group LLP

(57) ABSTRACT

A power transmission device is configured to transmit power underwater to an underwater vehicle having a power reception coil. The power transmission device includes a power transmission coil configured to transmit power to the power reception coil through a magnetic field, a power transmission unit configured to transmit an alternating current voltage having a frequency a 10 kHz or lower to the power transmission coil, and a first capacitor connected to the
(Continued)

power transmission coil and configured to form a resonance circuit resonating at the frequency with the power transmission coil.

10 Claims, 11 Drawing Sheets

(51) Int. Cl.
*H02J 50/50* (2016.01)
*H02J 7/02* (2016.01)
*H04B 5/00* (2006.01)

(52) U.S. Cl.
CPC .......... *B60L 2200/32* (2013.01); *H02J 7/025* (2013.01); *H04B 5/0037* (2013.01)

(58) Field of Classification Search
CPC ...... B60L 11/1825; B60L 53/31; B60L 53/12; B60L 2200/32; H04B 5/0037
See application file for complete search history.

(56) References Cited

U.S. PATENT DOCUMENTS

| | | | |
|---|---|---|---|
| 9,577,462 B2 | 2/2017 | Maekawa | |
| 9,859,051 B2* | 1/2018 | Ren | H01F 38/14 |
| 2005/0057422 A1 | 3/2005 | Deguchi et al. | |
| 2008/0164876 A1* | 7/2008 | Sakakura | G01R 33/385 |
| | | | 324/318 |
| 2012/0032632 A1* | 2/2012 | Soar | H01F 38/14 |
| | | | 320/108 |
| 2013/0154384 A1* | 6/2013 | Nakamura | H01F 38/14 |
| | | | 307/104 |
| 2014/0035379 A1* | 2/2014 | Stevens | H02J 7/0013 |
| | | | 307/104 |
| 2014/0143933 A1* | 5/2014 | Low | G04C 10/00 |
| | | | 2/170 |
| 2014/0232200 A1 | 8/2014 | Maekawa | |
| 2014/0312702 A1* | 10/2014 | Uchida | H02J 17/00 |
| | | | 307/80 |
| 2015/0002092 A1 | 1/2015 | Niizuma | |
| 2015/0015087 A1 | 1/2015 | Endo et al. | |
| 2015/0207334 A1* | 7/2015 | Mitcheson | G01R 31/04 |
| | | | 307/104 |
| 2015/0224883 A1* | 8/2015 | Ichikawa | B60L 50/40 |
| | | | 320/108 |
| 2015/0326028 A1* | 11/2015 | Suzuki | H02J 7/025 |
| | | | 307/104 |
| 2015/0365066 A1 | 12/2015 | Tanomura et al. | |
| 2016/0013664 A1 | 1/2016 | Maekawa et al. | |
| 2016/0049799 A1 | 2/2016 | Takatsu et al. | |
| 2018/0062430 A1* | 3/2018 | Matsumoto | H02J 7/00 |

FOREIGN PATENT DOCUMENTS

| | | |
|---|---|---|
| JP | 2011-183950 A | 9/2011 |
| JP | 2013-215049 A | 10/2013 |
| JP | 2013-219972 A | 10/2013 |
| JP | 2014-222975 A | 11/2014 |
| JP | 2015-15901 A | 1/2015 |
| JP | 2015-23669 A | 2/2015 |
| WO | 2014/129531 A1 | 8/2014 |
| WO | 2015/087724 A1 | 6/2015 |

OTHER PUBLICATIONS

Concise Explanation of Written Submission of Certificate concerning Exception to Lack of Novelty, dated Aug. 5, 2015, for related Japanese Patent Application No. 2015-144090, 8 pages.
International Search Report, dated Jul. 19, 2016, for related International Patent Application No. PCT/JP2016/002600, 5 pages. (with English Translation).
Written Opinion of the International Searching Authority, dated Jul. 19, 2016, for related International Patent Application No. PCT/JP2016/002600, 10 pages. (with English Translation).
Written Submission of Certificate concerning Exception to Lack of Novelty, dated Aug. 5, 2015, for related Japanese Patent Application No. 2015-144090, 12 pages. (with English Translation and English language concise explanation).
Written Submission of Evidence, dated Aug. 5, 2015, for related Japanese Patent Application No. 2015-144090, 3 pages. (with English Translation).

\* cited by examiner

FIG. 10
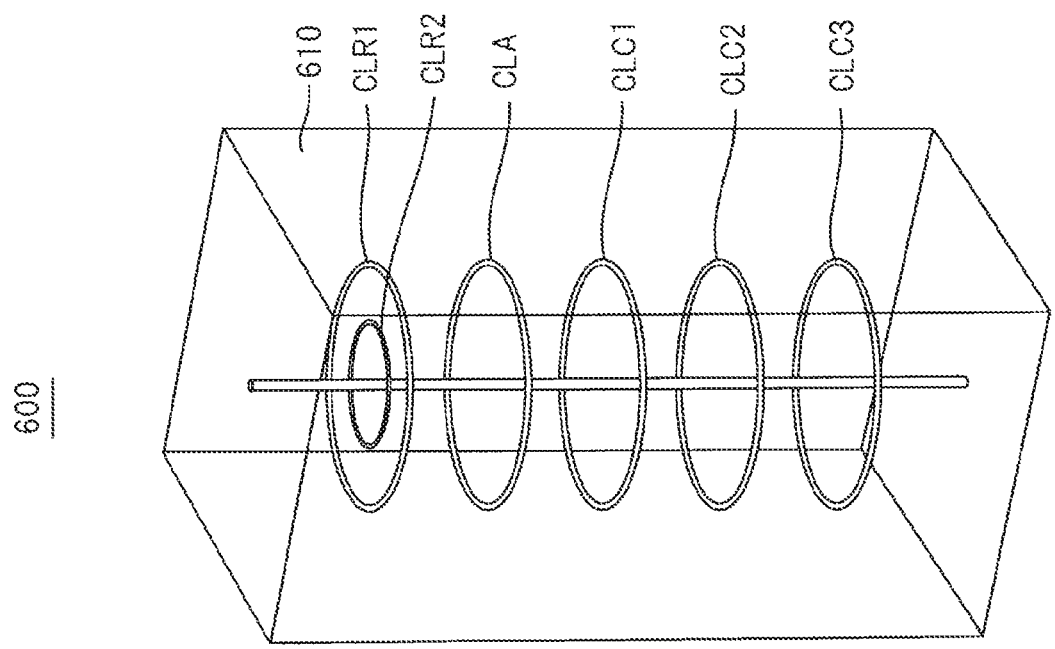
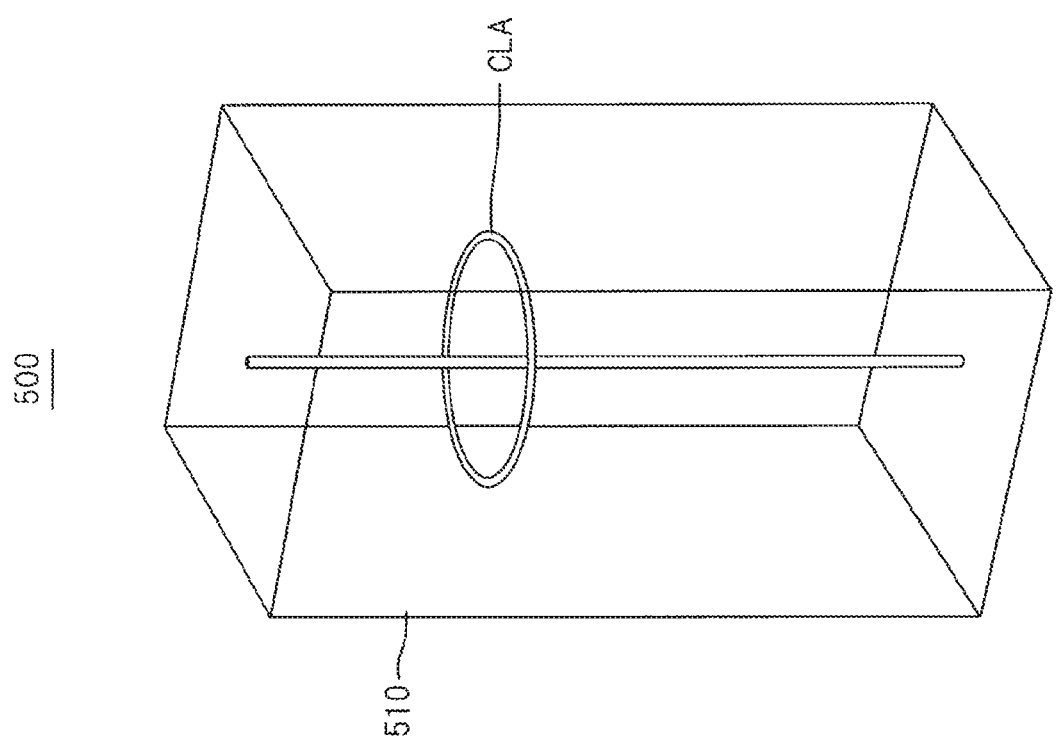

POWER TRANSMISSION DEVICE

TECHNICAL FIELD

The present disclosure relates to a power transmission device that wirelessly transmits power underwater.

BACKGROUND ART

In the related art, a technique of wirelessly transmitting power between an underwater base station as a power transmission device and an underwater vehicle as a power receiving device by means of magnetic resonance is known (for example, refer to Patent Literature 1). The power transmission device includes a power transmission resonance coil, a balloon, and a balloon control mechanism. The power transmission resonance coil wirelessly transmits power to a power reception resonance coil of the power receiving device by means of magnetic resonance. The balloon houses the power transmission resonance coil. The balloon control mechanism causes the balloon to inflate during power transmission such that water between the power transmission resonance coil and the power reception resonance coil is removed.

In addition, an antenna device that transmits power and data to an IC-integrated medium by electromagnetic induction utilizing a frequency band of 13.56 MHz is known (for example, refer to Patent Literature 2). The antenna device includes: at least one power-fed loop antenna to which a signal current is supplied; and at least one non-power-fed loop antenna to which a signal current is not supplied, in which a signal current is generated in the non-power-fed loop antenna using a magnetic field generated from the power-fed loop antenna such that the communication range of the power-fed loop antenna expands.

PRIOR ART DOCUMENT

Patent Literature

Patent Literature 1: JP-A-2015-015901
Patent Literature 2: JP-A-2005-102101

SUMMARY OF THE INVENTION

Problems that the Invention is to Solve

It is known that an underwater electromagnetic wave is attenuated by a phenomenon such as radiation, absorption, or reflection. In particular, as the frequency of an electromagnetic wave increases, the attenuation amount of the electromagnetic wave increases. In a case where wireless power transmission to an underwater vehicle is performed using an electromagnetic wave in a frequency band of 13.56 MHz as described in Patent Literature 2, the propagation intensity of the electromagnetic wave is attenuated to one several tenth per one meter. Therefore, it is difficult to efficiently perform wireless power transmission.

The present disclosure has been made in consideration of the above-described circumstances and provides a power transmission device capable of efficiently performing wireless power transmission underwater to an underwater vehicle.

Means for Solving the Problem

A power transmission device according to the present disclosure is configured to transmit power underwater to an underwater vehicle including a power reception coil. The power transmission device includes a power transmission coil configured to transmit power to the power reception coil through a magnetic field, a power transmission unit configured to transmit an alternating current voltage having a frequency of 10 kHz or lower to the power transmission coil, and a first capacitor connected to the power transmission coil and configured to form a resonance circuit resonating at the frequency with the power transmission coil.

Advantageous Effects of the Invention

According to the present disclosure, wireless power transmission underwater to an underwater vehicle can be efficiently performed.

BRIEF DESCRIPTION OF THE DRAWINGS

FIG. 10 is a diagram illustrating simulation models for investigating undersea magnetic field propagation characteristics of the power transmission system.

MODE FOR CARRYING OUT THE INVENTION

Hereinafter, embodiments will be described in detail appropriately with reference to the drawings. Detailed description beyond necessity may be omitted. For example, detailed description of a matter that has been already known well or overlapping description of a substantially identical configuration may be omitted. This is to avoid unnecessary redundancy of the following description and to make those skilled in the art easily understand the present disclosure. Note that the attached drawings and the following description are provided in order that those skilled in the art fully understand the present disclosure, and are not intended to limit the subject matter described in the appended claims.

First Embodiment

[Configuration and the Like]

Figure 1:
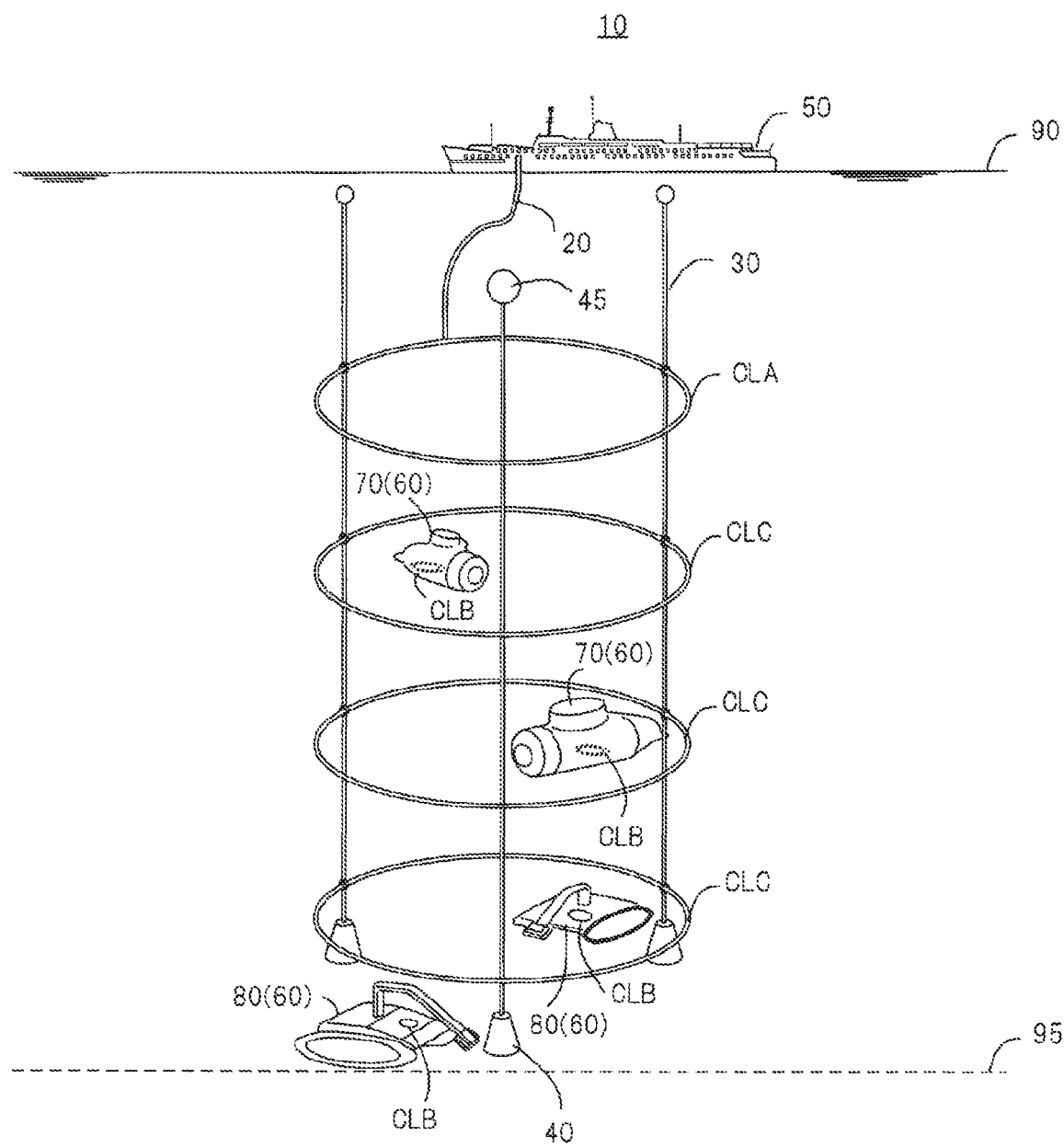
FIG. 1 is a schematic diagram illustrating an example of an environment in which a power transmission system according to a first embodiment is provided.

FIG. 1 is a schematic diagram illustrating an example of an environment in which a power transmission system 10 according to a first embodiment is provided. The power transmission system 10 includes a power transmission device 100, a power receiving device 200, and coils CL (refer to FIG. 2). The power transmission device 100 wirelessly (contactlessly) transmits power to the power receiving device 200 through the plural coils CL by means of magnetic resonance. The number of coils CL disposed is n which is arbitrary.

The coils CL are formed in, for example, a ring shape and are covered with a resin cover to be insulated. The coils CL are, for example, helical coils or spiral coils. The coils CL include a power transmission coil CLA and a power reception coil CLB. The power transmission coil CLA is a primary coil, and the power reception coil CLB is a secondary coil.

In addition, the coils CL may include one or more repeating coils CLC (booster coils) that are disposed between the power transmission coil CLA and the power reception coil CLB. The repeating coils CLC are disposed substantially parallel to each other, and more than half of opening surfaces formed by the repeating coils CLC overlap each other. A distance between the plural repeating coils CLC is secured to be greater than or equal to, for example, a radius of the repeating coil CLC.

The power transmission coil CLA is provided in the power transmission device 100. The power reception coil CLB is provided in the power receiving device 200. The repeating coils CLC may be provided in the power transmission device 100, may be provided in the power receiving device 200, or may be provided separately from the power transmission device 100 and the power receiving device 200. A configuration may be adopted in which some of the repeating coils CLC are provided in the power transmission device 100 and the other repeating coils CLC are provided in the power receiving device 200.

The power transmission device 100 is provided in a ship 50. The power receiving device 200 is provided in an underwater vehicle 60 (for example, a submarine 70 or an underwater excavator 80). Each of the coils CL is disposed underwater (undersea).

A part of the ship 50 is present over a water surface 90 (for example, a sea surface), that is, over water, and the other part of the ship 50 is present under the water surface 90, that is, underwater. The ship 50 is movable over water and, for example, is freely movable over water at a data acquisition point. The power transmission device 100 of the ship 50 and the power transmission coil CLA are connected to each other through an electrical wire 20. The electrical wire 20 is connected to, for example, a driver 151 (refer to FIG. 2) in the power transmission device 100 through a connector (not illustrated) over water.

The underwater vehicle 60 is present underwater or at a water bottom 95 (for example, sea bottom) and travels underwater or at the water bottom 95. For example, the underwater vehicle 60 is freely movable to a data acquisition point according to an instruction from the ship 50 over water. The instruction from the ship 50 may be transmitted by communication through the respective coils CL, or may be transmitted using another communication method.

The respective coils CL are connected to connectors 30 and are disposed, for example at regular distances. The distance (coil distance) between adjacent coils CL is in the order of, for example, 100 meters. For example, the coil distance is the length of about half of the diameter of the coil CL. The power transmission frequency is 10 kHz or lower. The reason why the power transmission frequency is set as 10 kHz will be described below. As the power transmission frequency decreases, the power transmission distance increases. As a result, the size of the coils CL can increase, and the coil distance can increase.

In addition, the inductance of the coils CL is determined based on the power transmission frequency, and the length and winding number of the coils CL are determined. The length of the coils CL is, for example, several tens of meters to several hundreds of meters. In addition, as the thickness of the coils CL increases, the electrical resistance of the coils CL decreases, and the electrical loss decreases. In addition, power transmitted through the coils CL is, for example, in the order of 50 W or higher and may be in the order of kW.

In FIG. 1, the number of connectors 30 is three but is not limited thereto. Weights 40 are connected to end portions of the connectors 30 on the power reception coil CLB side. Buoys 45 are connected to end portions of the connectors 30 on the power transmission coil CLA side.

The movements of the connectors 30 can be restricted by the weights 40, and the movements of the respective coils CL connected to the connectors 30 can be restricted. Accordingly, even in a case where a water current is generated underwater, the movements of the respective coils CL are restricted by the weights 40. Therefore, a decrease in the efficiency of power transmission using the coils CL can be suppressed.

Figure 2:
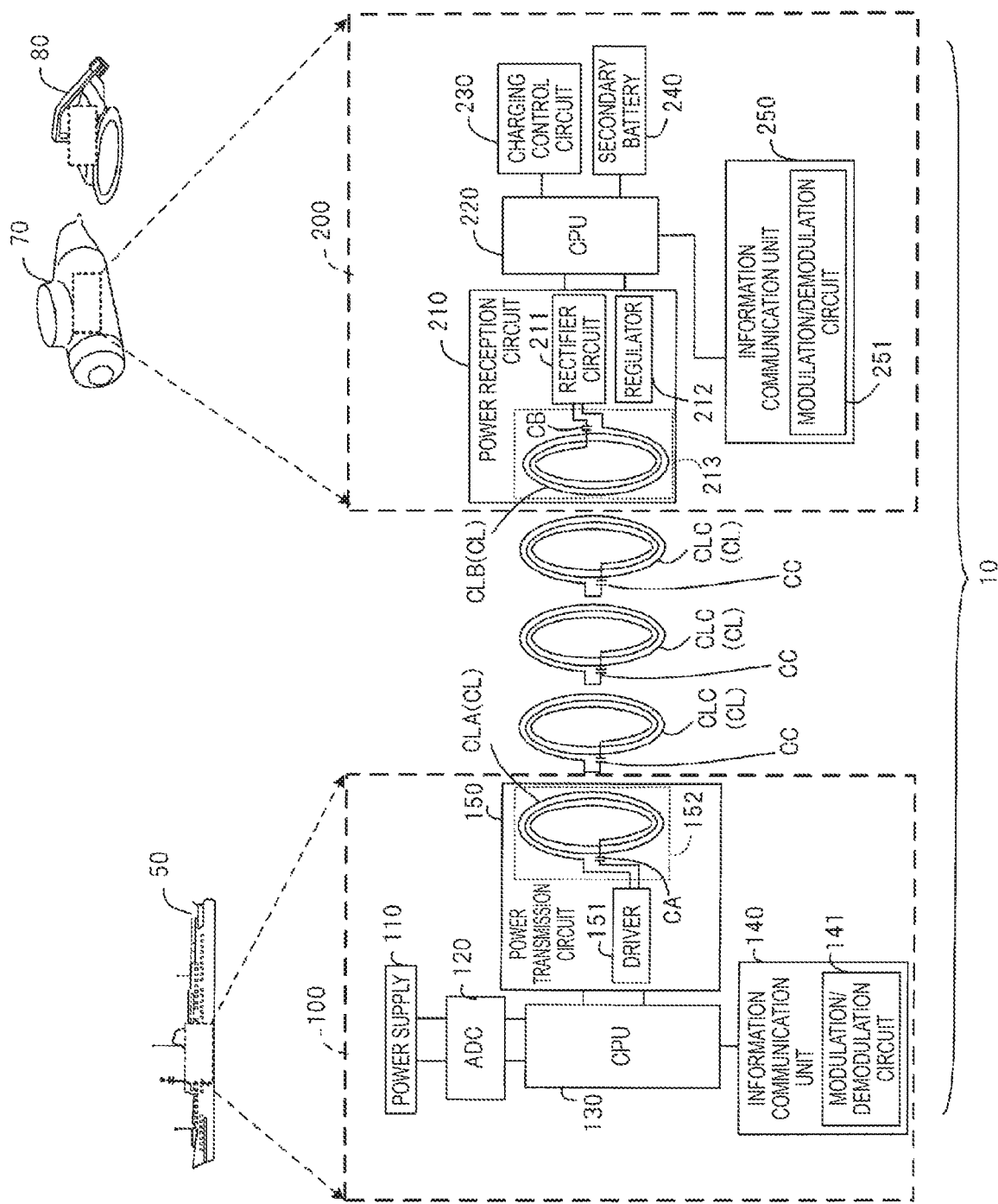
FIG. 2 is a block diagram illustrating a configuration example of the power transmission system.

FIG. 2 is a block diagram illustrating a configuration example of the power transmission system 10. The power transmission system 10 includes the power transmission device 100 and the power receiving device 200.

The power transmission device 100 includes a power supply 110, an ADC (AC/DC converter) 120, a CPU (central processing unit) 130, an information communication unit 140, and a power transmission circuit 150.

The ADC 120 converts alternating current power supplied from the power supply 110 into direct current power. The converted direct current power is supplied to the power transmission circuit 150.

The CPU 130 controls operations of the respective units (for example, the power supply 110, the ADC 120, the information communication unit 140, and the power transmission circuit 150) of the power transmission device 100.

The information communication unit 140 includes a modulation/demodulation circuit 141 that modulates or demodulates communication data transferred between the information communication unit 140 and the power receiving device 200. The information communication unit 140 transmits, for example, control information from the power transmission device 100 to the power receiving device 200 through the coils CL. The information communication unit 140 receives, for example, data from the power receiving device 200 to the power transmission device 100 through the coils CL. This data includes data regarding the results of an underwater investigation or a water-bottom investigation by the power receiving device 200. The information communication unit 140 enables data communication with the underwater vehicle 60 quickly while the underwater vehicle 60 performs an operation such as data collection.

The power transmission circuit 150 includes the driver 151 and a resonance circuit 152. The driver 151 converts direct current power supplied from the ADC 120 into an alternating current voltage (pulse waveform) having a predetermined frequency. The resonance circuit 152 is configured to include a capacitor CA and the power transmission coil CLA, and generates an alternating current voltage having a sine waveform from the alternating current voltage having a pulse waveform supplied from the driver 151. The power transmission coil CLA resonates at a predetermined resonance frequency according to the alternating current voltage applied from the driver 151. The power transmission coil CLA is impedance-matched to an output impedance of the power transmission device 100.

The power receiving device 200 includes a power reception circuit 210, a CPU 220, a charging control circuit 230, a secondary battery 240, and an information communication unit 250.

The power reception circuit 210 includes a rectifier circuit 211, a regulator 212, and a resonance circuit 213. The resonance circuit 213 is configured to include a capacitor CB and the power reception coil CLB, and receives an alternating current power transmitted from the power transmission coil CLA. The power reception coil CLB is impedance-matched to an input impedance of the power receiving device 200. The rectifier circuit 211 converts alternating current power induced in the power reception coil CLB into direct current power. The regulator 212 converts a direct current voltage transmitted from the rectifier circuit 211 into a predetermined voltage which is suitable for charging of the secondary battery 240.

The CPU 220 controls operations of the respective units (for example, the power reception circuit 210, the charging control circuit 230, the secondary battery 240, and the information communication unit 250) of the power receiving device 200.

The charging control circuit 230 controls charging of the secondary battery 240 according to the kind of the secondary battery 240. For example, in a case where the secondary battery 240 is a lithium ion battery, the charging control circuit 230 start charging the secondary battery 240 at a constant voltage using the direct current power supplied from the regulator 212.

The secondary battery 240 stores power transmitted from the power transmission device 100. The secondary battery 240 is, for example, a lithium ion battery.

The information communication unit 250 includes a modulation/demodulation circuit 251 that modulates or demodulates communication data transferred between the information communication unit 250 and the power transmission device 100. The information communication unit 250 receives, for example, control information from the power transmission device 100 to the power receiving device 200 through the coils CL. The information communication unit 250 transmits, for example, data from the power receiving device 200 to the power transmission device 100 through the coils CL. This data includes data regarding the results of an underwater investigation or a water-bottom investigation by the power receiving device 200. Through the information communication unit 250, the ship 50 can rapidly communicate data with the underwater vehicle 60 while the underwater vehicle 60 performs an operation such as data collection.

As in the power transmission coil CLA and the power reception coil CLB, the repeating coil CLC constitutes a resonance circuit with a capacitor CC. That is, in the embodiment, by disposing the resonance circuits underwater in multiple stages, power is transmitted by means of magnetic resonance.

Next, power transmission from the power transmission device 100 to the power receiving device 200 will be described.

In the resonance circuit 152, in a case where a current flows through the power transmission coil CLA of the power transmission device 100, a magnetic field is generated around the power transmission coil CLA. Vibration of the generated magnetic field is transmitted to the resonance circuit including the repeating coil CLC or the resonance circuit 213 including the power reception coil CLB that resonates at the same frequency.

In the resonance circuit including the repeating coil CLC, a current is excited by the vibration of the magnetic field in the repeating coil CLC and flows through the repeating coil CLC such that a magnetic field is further generated around the repeating coil CLC. Vibration of the generated magnetic field is transmitted to another resonance circuit including another repeating coil CLC or the resonance circuit 213 including the power reception coil CLB that resonates at the same frequency.

In the power reception coil CLB of the resonance circuit 213, an alternating current is induced by the vibration of the magnetic field of the repeating coil CLC or the power transmission coil CLA. The induced alternating current is rectified and converted into a predetermined voltage and charges the secondary battery 240.

[Simulation of Propagation Characteristics]

Figure 3:
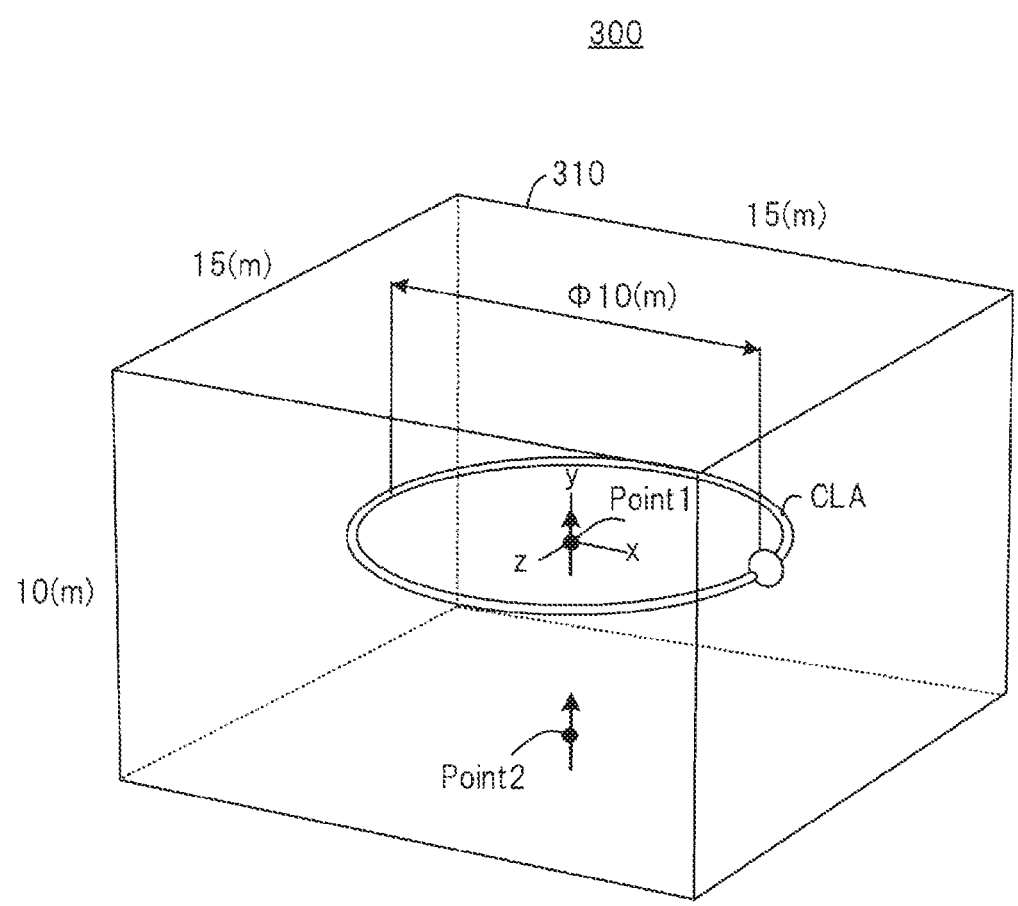
FIG. 3 is a diagram illustrating a simulation model for investigating propagation characteristics of a magnetic field generated from a power transmission coil.

FIG. 3 illustrates a simulation model 300 for investigating propagation characteristics of a magnetic field generated from the power transmission coil CLA. The simulation model 300 is configured by a model of the power transmission coil CLA and an analysis area 310. The power transmission coil CLA is modeled under conditions of coil diameter: 10 m, core wire diameter: 0.2 m, and coil turn number: 1. In the simulation, propagation characteristics were measured using, for example, PC (personal computer; not illustrated).

The analysis area 310 is a region of x direction (horizontal direction): 15 m, y direction (vertical direction): 10 m, and z direction (depth direction): 15 m. In the simulation, three kinds of materials including vacuum (also simply referred to as "V"), water (simply referred to as "W"), and water (Sea) (simply referred to as "W.S") are set as a material of the analysis area 310, and the intensities of a magnetic field propagating under the three kinds of materials are inspected. In the simulation model 300, an alternating current having an amplitude of 1A is caused to flow through the power transmission coil CLA. In addition, the frequency (analysis frequency) of the alternating current is set to be in a range of 1 kHz to 100 kHz. In addition, in the simulation model 300, the center point of the analysis area 310 is set as an origin. The center point of the power transmission coil CLA matches with the center point of the analysis area 310.

Figure 4:
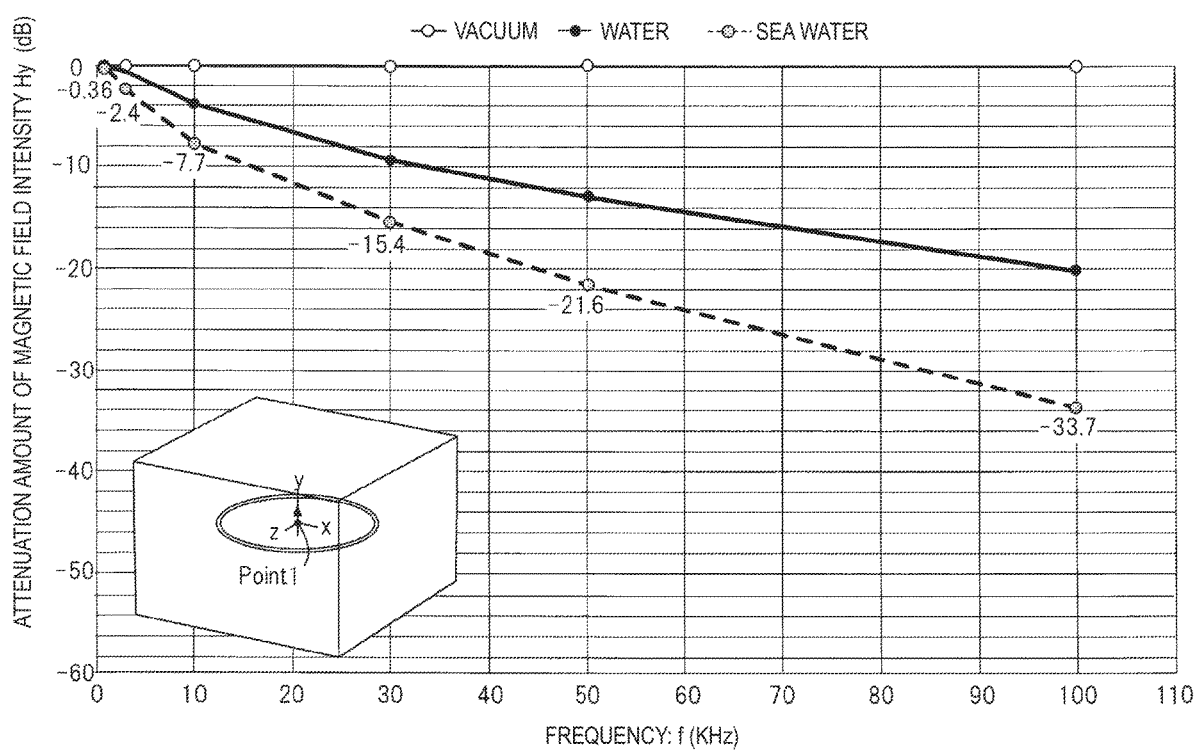
FIG. 4 is a schematic diagram illustrating an example of frequency characteristics of the attenuation amount of magnetic field intensity Hy at an observation point 1.

FIG. 4 illustrates frequency characteristics of the attenuation amount of a magnetic field intensity Hy at the origin of the analysis area 310 (the center point of the power transmission coil CLA). In FIG. 4, the attenuation amount of the magnetic field intensity Hy is plotted in units of decibels (dB). Hereinafter, the origin will also be referred to as "observation point 1 (Point 1). In addition, the origin will also be expressed as (x,y,z)=(0,0,0).

It can be seen from FIG. 4 that, under the vacuum, the magnetic field intensity Hy at the observation point 1 does not change depending on the frequency. On the other hand, it can be seen that, as the frequency increases under the water and under the sea, the attenuation amount of the magnetic field intensity Hy increases. Further, under the sea, the attenuation amount further increases as compared to that under the water.

Figure 5:
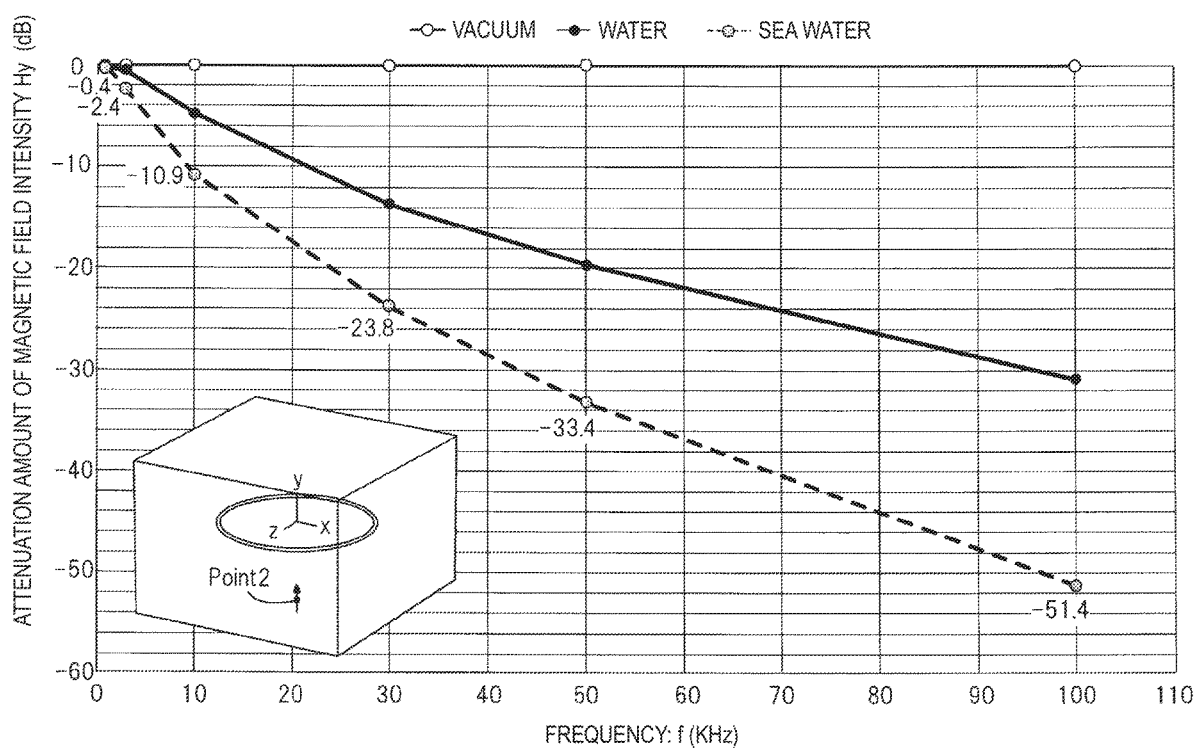
FIG. 5 is a schematic diagram illustrating an example of frequency characteristics of the attenuation amount of the magnetic field intensity Hy at an observation point 2.

FIG. 5 illustrates frequency characteristics of the attenuation amount of the magnetic field intensity Hy at a position shifted from the observation point 1 (origin) of the analysis area 310 by −5 m in the y direction (vertical direction). In FIG. 5, as in FIG. 4, the attenuation amount of the magnetic field intensity Hy is plotted in units of decibels (dB). Hereinafter, the position shifted from the observation point 1 (origin) of the analysis area 310 by −5 m in the vertical direction will also be referred to as "observation point 2 (Point 2)". In addition, the observation point 2 will also be expressed as (x,y,z)=(0,−5,0).

It can be seen from FIG. 5 that, under the vacuum, the magnetic field intensity Hy at the observation point 2 does not change depending on the frequency. On the other hand, it can be seen that, as in the observation point 1, as the frequency increases under the water and under the sea, the attenuation amount of the magnetic field intensity Hy increases. Further, under the sea, the attenuation amount further increases as compared to that under the water. The observation point 2 is at a distance from the power transmission coil CLA, and thus the value of the magnetic field intensity Hy decreases. However, the observation point 2 shows the same tendency as that of observation point 1.

Figure 6:
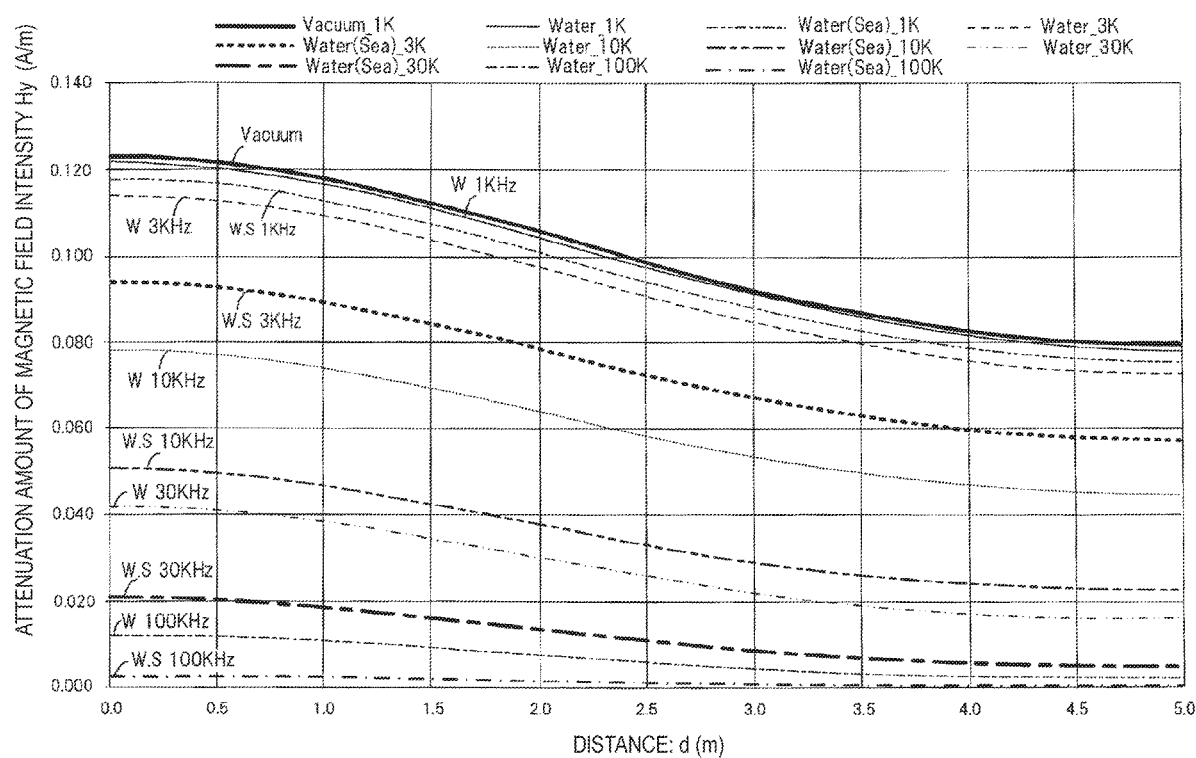
FIG. 6 is a schematic diagram illustrating an example of distance characteristics of the magnetic field intensity Hy (unit: Nm).
Figure 7:
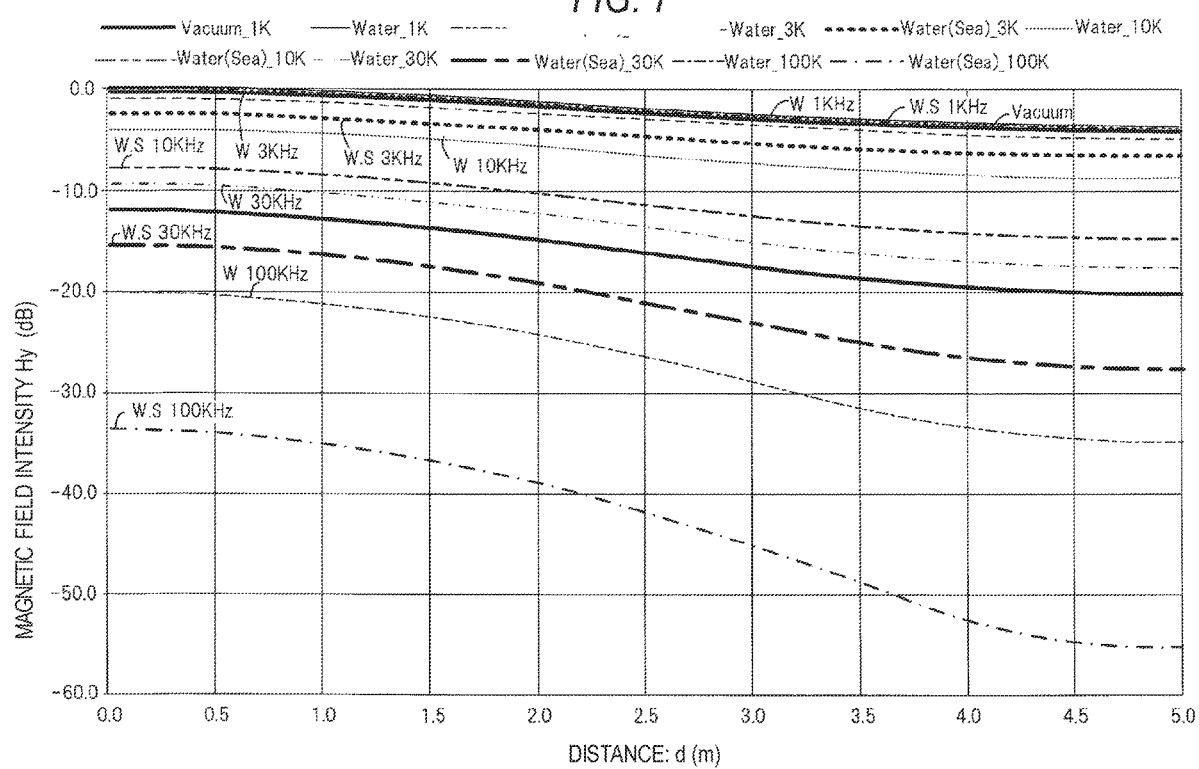
FIG. 7 is a schematic diagram illustrating an example of distance characteristics (dB value) of the magnetic field intensity Hy.

In FIG. 6, regarding each of the materials (vacuum, water, and sea water) set in the analysis area 301, distance characteristics of the magnetic field intensity Hy (unit: A/m) at analysis frequencies of 1 kHz, 3 kHz, 10 kHz, 30 kHz, and 100 kHz were plotted. The plotting of the distance characteristics is performed on a region from the observation point 1 (y=0 m) to the observation point 2 (y=−5 m) along the y axis. In addition, in FIG. 7, the distance characteristics of the magnetic field intensity Hy illustrated in FIG. 6 are plotted in units of decibels (dB).

Referring to FIGS. 4 to 7, at the observation point 1, in a case where the frequency is 1 kHz, the magnetic field intensity Hy under the sea is about 94% of the magnetic field intensity Hy under the vacuum. In a case where the frequency is 3 kHz, the magnetic field intensity Hy under the sea is about 78% of the magnetic field intensity Hy under the vacuum. In a case where the frequency is 10 kHz, the magnetic field intensity Hy under the sea is about 41% of the magnetic field intensity Hy under the vacuum. In a case where the frequency is 30 kHz, the magnetic field intensity Hy under the sea is about 16% of the magnetic field intensity Hy under the vacuum. In a case where the frequency is 100 kHz, the magnetic field intensity Hy under the sea is about 2% of the magnetic field intensity Hy under the vacuum.

In addition, at the observation point 2, in a case where the frequency is 1 kHz, the magnetic field intensity Hy under the sea is about 90% of the magnetic field intensity Hy under the vacuum. In a case where the frequency is 3 kHz, the magnetic field intensity Hy under the sea is about 71% of the magnetic field intensity Hy under the vacuum. In a case where the frequency is 10 kHz, the magnetic field intensity Hy under the sea is about 28% of the magnetic field intensity Hy under the vacuum. In a case where the frequency is 30 kHz, the magnetic field intensity Hy under the sea is about 6% of the magnetic field intensity Hy under the vacuum. In a case where the frequency is 100 kHz, the magnetic field intensity Hy under the sea is about 0.1% of the magnetic field intensity Hy under the vacuum.

This way, it can be understood that, in a case where the frequency exceeds 10 kHz under the sea, in the region from the observation point 1 to the observation point 2 (that is, in a region of about 5 m from the power transmission coil CLA), the magnetic field intensity Hy is attenuated to a maximum of about 20% as compared to that under the vacuum. The underwater vehicle 60 receives power supply at a distance of several meters from the power transmission coil CLA (or the repeating coil CLC). In a case where the magnetic field intensity Hy is attenuated to a maximum of 20%, the wireless power transmission to the underwater vehicle 60 cannot be efficiently performed.

In order to effectively perform the wireless power transmission to the underwater vehicle 60 under the sea in a region at a distance of several meters from the power transmission coil CLA, it is necessary that the magnetic field intensity be at least 30% of that under the vacuum. Accordingly, for the wireless power transmission under the sea, it is necessary that the frequency of an alternating current voltage applied to the power transmission coil CLA be set to be 10 kHz or lower.

Figure 8:
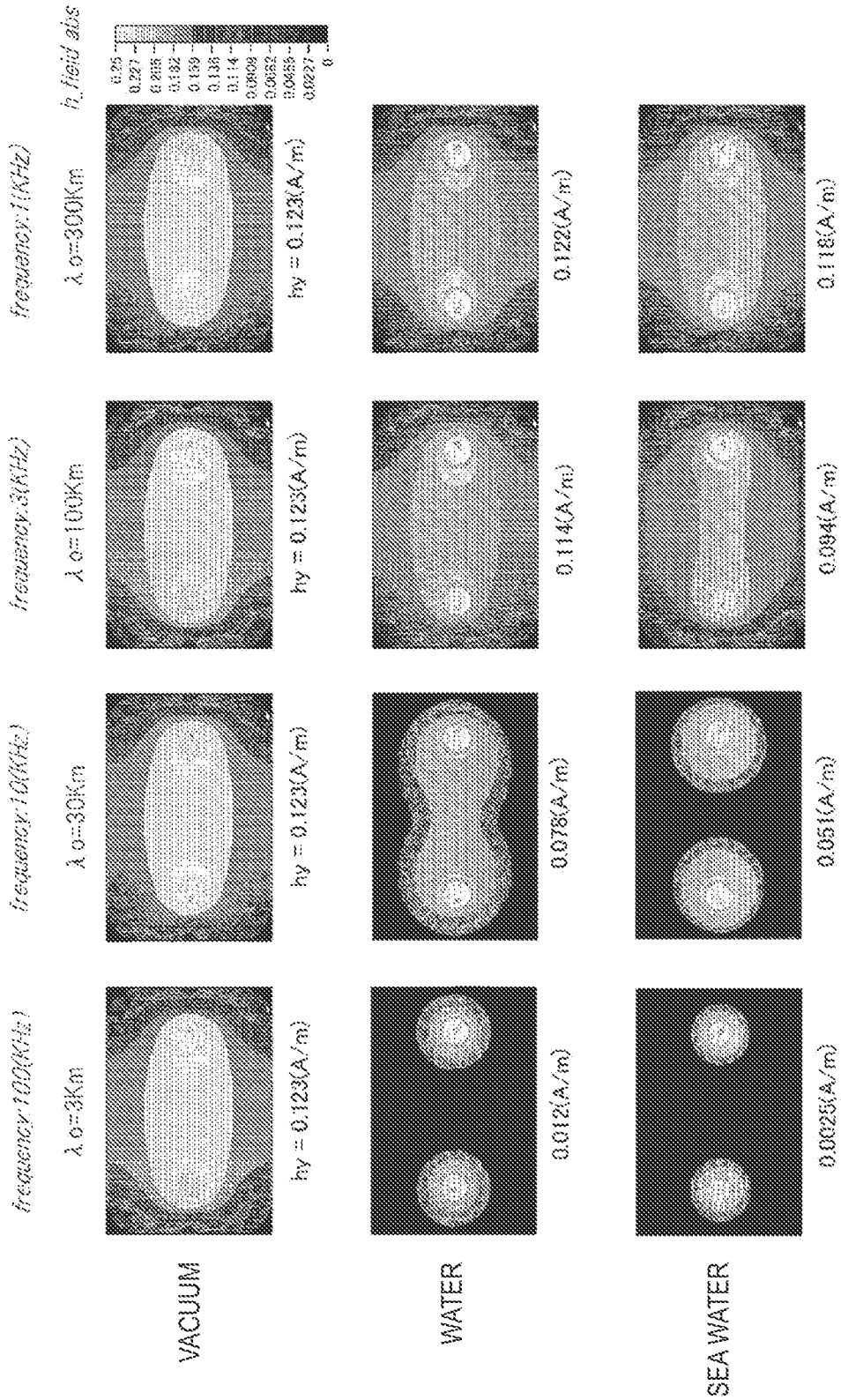
FIG. 8 is a schematic diagram illustrating an example of a magnetic field intensity distribution in the vicinity of the power transmission coil.

FIG. 8 illustrates a magnetic field intensity distribution in the vicinity of the power transmission coil CLA regarding each of the materials (vacuum, water, and sea water) set in the analysis area 301. FIG. 8 illustrates the magnetic field intensity distribution corresponding to four analysis frequencies (1 kHz, 3 kHz, 10 kHz, 100 kHz).

Second Embodiment

Figure 9:
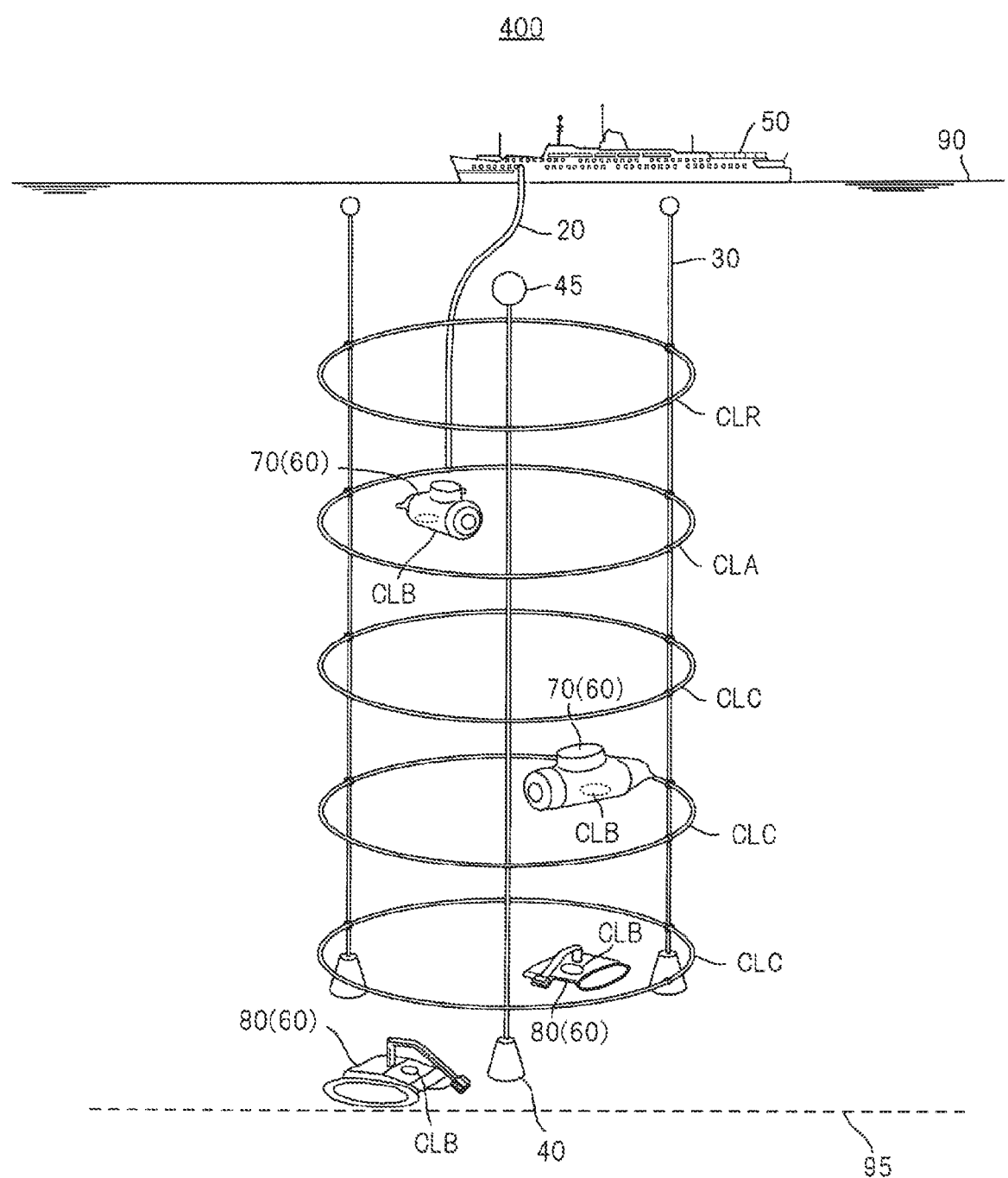
FIG. 9 is a schematic diagram illustrating an example of an environment in which a power transmission system according to a second embodiment is provided.

FIG. 9 is a schematic diagram illustrating an example of an environment in which a power transmission system 400 according to a second embodiment is provided. In FIG. 9, components common to those of the first embodiment will be represented by the same reference numerals. In addition, for simplification of description, the description of the components common to those of the first embodiment will be appropriately omitted.

[Configuration and the Like]

The power transmission system 400 is different from that of the first embodiment, in that a reflection coil CLR is present between the power transmission coil CLA and the water surface 90. The reflection coil CLR reflects a magnetic field, which is emitted in a direction from the power transmission coil CLA to the water surface 90, in a direction to the water bottom 95. As a result, the emission of the magnetic field, emitted from the power transmission coil CLA, to the water surface 90 can be suppressed. Accordingly, an interference between the magnetic field emitted from the power transmission coil CLA and communication in a very low frequency (VLF) band or an ultra low frequency (ULF) band over or under the water can be suppressed.

In the reflection coil CLR, it is necessary to avoid resonance with the power transmission coil CLA. Therefore, unlike the power reception coil CLB or the repeating coil CLC, the reflection coil CLR is not connected to a capacitor, and a resonance circuit is not formed. That is, the reflection coil CLR forms a closed loop having no capacitor.

In addition, the reflection coil CLR is not limited to one ring illustrated in FIG. 9. For example, in the reflection coil CLR, a second reflection coil having a coil diameter less than that of the reflection coil CLR may be disposed concentrically with the reflection coil CLR. As a result, the area in which the magnetic field emitted from the power transmission coil CLA can be reflected in the direction to the water bottom increases, and thus the emission of the magnetic field from the water surface 90 can be more reliably suppressed.

[Simulation of Propagation Characteristics]

FIG. 10 is a diagram illustrating simulation models 500 and 600 for investigating undersea magnetic field propagation characteristics of the power transmission system 400.

The simulation model 500 is configured by a model of the power transmission coil CLA and an analysis area 510. The power transmission coil CLA is modeled under conditions of coil diameter: 10 m, core wire diameter: 0.2 m, and coil turn number: 1.

The analysis area 510 is a rectangular region of x direction (horizontal direction): 15 m, y direction (vertical direction): 30 m, and z direction (depth direction): 15 m. In the simulation, sea water is set as a material of the analysis area 510, and the intensity of a magnetic field propagating under the sea water is investigated. In the simulation model 500, an alternating current having an amplitude of 1A and a frequency of 3 kHz is caused to flow through the power transmission coil CLA. In addition, in the simulation model 500, the center point of an upper surface (zx plane) of the rectangle of the analysis area 510 is set as an origin. The center point of the power transmission coil CLA is positioned at a position shifted from the origin by −10 m in the y direction.

The simulation model 600 is configured by the power transmission coil CLA, three repeating coils (CLC1, CLC2, CLC3), two reflection coils (CLR1, CLR2) and an analysis area 610. The power transmission coil CLA, the repeating coils CLC1 to CLC3, and the reflection coil CLR1 have the same shape and are modeled under conditions of coil diameter: 10 m, core wire diameter: 0.2 m, and coil turn number: 1. A shape of the reflection coil CLR2 is modeled under conditions of coil diameter: 5 m, core wire diameter: 0.2 m, and coil turn number: 1. The center point of the reflection coil CLR2 is disposed to overlap the center point of the reflection coil CLR1.

An object of the simulation model 600 is to investigate a difference in magnetic field intensity depending on whether or not the repeating coils (CLC1 to CLC3) and the reflection coils (CLR1, CLR2) are provided as compared to the simulation model 500.

As in the analysis area 510, the analysis area 610 is a rectangular region of x direction (horizontal direction): 15 m, y direction (vertical direction): 30 m, and z direction (depth direction): 15 m. In the simulation, sea water is set as a material of the analysis area 610. In the simulation model 600, an alternating current having an amplitude of 1A and a frequency of 3 kHz is caused to flow through the power transmission coil CLA.

In addition, in the simulation model 600, the center point of an upper surface (zx plane) of the rectangle of the analysis area 610 is set as an origin. The center point of the power transmission coil CLA is positioned at a position shifted from the origin by −10 m in the y direction. The center point of the repeating coil CLC1 is positioned at a position shifted from the origin by −15 m in the y direction. The center point of the repeating coil CLC2 is positioned at a position shifted from the origin by −20 m in the y direction. The center point of the repeating coil CLC3 is positioned at a position shifted from the origin by −25 m in the y direction. Center points of the reflection coils CLR1 and CLR2 are positioned at a position shifted from the origin by −5 m in the y direction.

Figure 11:
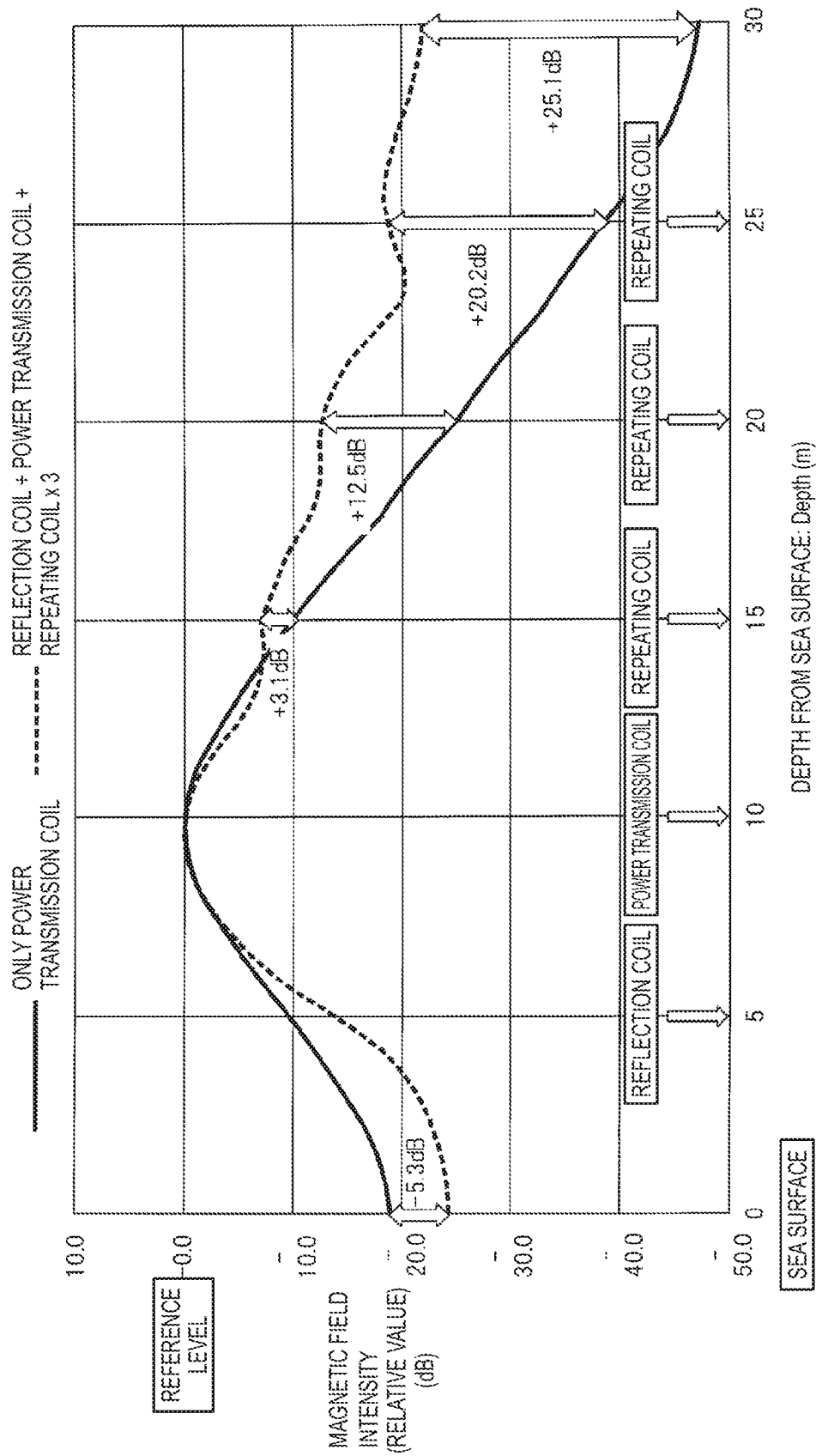
FIG. 11 is a schematic diagram illustrating an example of the undersea magnetic field propagation characteristics.

FIG. 11 illustrates the undersea magnetic field propagation characteristics of the simulation models 500 and 600. In FIG. 11, a magnetic field intensity in a depth direction along the y axis relative to the magnetic field intensity at the center point (X=0 m, y=−10 m, z=0 m) of the power transmission coil CLA is plotted.

It can be understood from FIG. 11 that, in a region (y<−10) at a depth of more than 10 m from the sea surface, the magnetic field intensity of the simulation model 600 is higher than that of the simulation model 500. As described above, the reason for this is that, in the simulation model 600, magnetic resonance of the three repeating coils (CLC1 to CLC3) occurs in a chain reaction due to a magnetic field emitted from the power transmission coil CLA. As a result, in the simulation model 600 (that is, the power transmission system 400), a high magnetic field intensity can be maintained even in the region of y<−10. By disposing the repeating coils CLC1 to CLC3 in multiple stages in the depth direction, a region where power can be supplied to the underwater vehicle 60 increases.

More specifically, the magnetic field intensity at the center point (x=0 m, y=−15 m, z=0 m) of the repeating coil CLC1 is increased by 3.1 dB as compared to a case where the repeating coil is not provided. In addition, the magnetic field intensity at the center point (x=0 m, y=−20 m, z=0 m) of the repeating coil CLC2 is increased by 12.5 dB as compared to a case where the repeating coil is not provided. The magnetic field intensity at the center point (x=0 m, y=−25 m, z=0 m) of the repeating coil CLC3 is increased by 20.2 dB as compared to a case where the repeating coil is not provided. In addition, the magnetic field intensity at a point (x=0 m, y=−30 m, z=0 m) is increased by 25.1 dB as compared to a case where the repeating coil is not provided.

On the other hand, it can be understood that, in a region (y>−10) at a depth of less than 10 m from the sea surface, the magnetic field intensity of the simulation model 600 is lower than that of the simulation model 500. As described above, the reason for this is that, in the simulation model 600, the magnetic field emitted from the power transmission coil CLA is reflected to the sea bottom by the two reflection coils (CLR1, CLR2). Accordingly, by disposing the reflection coils CLR1 and CLR2, the intensity of a magnetic field emitted from the water surface can be reduced.

More specifically, the magnetic field intensity at the center point (x=0 m, y=−5 m, z=0 m) of the reflection coils CLR1 and CLR2 is decreased by 4 dB as compared to a case where the reflection coil is not provided. In addition, the magnetic field intensity at the origin (sea surface) is decreased by 5.3 dB as compared to a case where the reflection coil is not provided.

Effects of First and Second Embodiments

In this way, in the power transmission system 10 according to the first embodiment, the frequency of the alternating current voltage applied to the power transmission coil CLA is 10 kHz or lower. Therefore, in a region of about half of the diameter of the power transmission coil CLA from the power transmission coil CLA, the magnetic field intensity can be maintained to be about at least 30% of that under the vacuum. Accordingly, the wireless power transmission to the underwater vehicle 60 moving undersea can be effectively performed. Accordingly, for the wireless power transmission under the sea, it is necessary that the frequency of an alternating current voltage applied to the power transmission coil CLA be set to be 10 kHz or lower.

In addition, in the power transmission system 400 according to the second embodiment, the reflection coil CLR is provided between the power transmission coil CLA and the water surface 90. Therefore, a magnetic field, which is emitted in a direction from the power transmission coil CLA to the water surface 90, can be reflected in a direction to the water bottom 95. As a result, the emission of the magnetic field, emitted from the power transmission coil CLA, to the water surface 90 can be suppressed. Accordingly, an interference between the magnetic field emitted from the power transmission coil CLA and communication in a very low frequency (VLF) band or an ultra low frequency (ULF) band over or under the water can be suppressed.

In addition, in the power transmission systems 10 and 400 according to the first and second embodiments, the movement of the power transmission coil CLA is suppressed by the weight 40 even in an environment where an underwater current is present. Therefore, even in an environment where an underwater current is present, it is not necessary that the underwater vehicle 60 be in contact with the power transmission coil CLA, a decrease in the efficiency of power transmission by means of magnetic resonance can be suppressed, and power can be stably received. Accordingly, the underwater vehicle 60 can continuously receive power supply while performing an operation such as data collection, and the operating rate of the underwater vehicle 60 is improved when receiving power supply. Thus, the power transmission device 100 can improve the efficiency of the underwater data collection operation.

In addition, by using the power transmission coil CLA of the power transmission device 100 and the power reception coil CLB of the power receiving device 200, the power transmission device 100 can wirelessly transmit power by means of magnetic resonance. In addition, in the power transmission device 100, the underwater vehicle 60 can receive power without moving to a predetermined power supply position. Therefore, the underwater vehicle 60 can freely move even during power feeding, and position-free power transmission can be performed. Accordingly, the power transmission device 100 can suppress an interference with the operation of the underwater vehicle 60 underwater or at the water bottom 95. Thus, the operation range of the underwater vehicle 60 can be widened even during charging, and the underwater vehicle 60 can be continuously charged even during an operation. In addition, the underwater vehicle 60 can be charged at an arbitrary timing, and thus the operation time can be reduced.

In addition, by using the repeating coil CLC, the power transmission device 100 can expand the power transmission distance by continuous electromagnetic induction. For example, by disposing the repeating coils CLC in multiple stages in a direction from the vicinity of the water surface 90 to the water bottom as illustrated in FIG. 1, the power transmission device 100 can transmit power up to a deep water position (for example, a water depth of 1000 m or more). In this case, the power transmission device 100 can wirelessly transmit power to the underwater vehicle 60 that performs a mining operation or an investigation of underwater resources, and a decrease in the operating rate of the underwater vehicle 60 during power feeding can be suppressed.

In addition, it is not necessary that the underwater vehicle 60 include a large battery for operating without receiving power supply. Therefore, the size and weight of the underwater vehicle 60 can be reduced.

Other Embodiments

As described above, the first embodiment has been described as an example of the technique of the present disclosure. However, the technique of the present disclosure is not limited to the embodiment and is also applicable to embodiments in which changes, substitutions, additions, omissions, or the like are made.

In the first and second embodiments, an underwater camera system that performs data collection or the like underwater or in the sea bottom has been described as the power transmission system 10. However, the power transmission system 10 is also applicable to other uses. For example, the power receiving device 200 may be provided in an underwater robot or an unmanned probe including various sensors, and then the underwater robot or the unmanned probe may be disposed underwater or at the water bottom 95. As a result, using the underwater robot or the unmanned probe, management of aquatic resources or aquaculture, operation and maintenance of infrastructure systems such as brides or dams, or underwater monitoring at ports can be performed.

In the first and second embodiments, the example in which the power transmission coil CLA, the repeating coils CLC, and the power reception coil CLB are disposed side by side in the direction from the water surface 90 to the water bottom 95 has been described. However, the direction of disposing the coils CL is not limited to the example. For example, the power transmission coil CLA, the repeating coils CLC, and the power reception coil CLB may be disposed side by side in a direction along the water surface 90 or the water bottom 95. As a result, the power transmission device 100 can transmit power in a direction parallel to the underwater.

In the first and second embodiments, the CPUs 130 and 220 have been described as an example. However, a processor other than the CPUs 130 and 220 may be used. The processor may have any physical configuration. In addition, in a case where a programmable processor is used, processing details can be changed by changing a program. Therefore, the degree of freedom in designing the processor can be improved. The processor may be configured by one semiconductor chip or may be physically configured by plural semiconductor chips. In a case where the processor is configured by plural semiconductor chips, the respective controls of the first embodiment may be realized by different semiconductor chips, respectively. In this case, it can be considered that the plural semiconductor chips configure one processor. In addition, the processor may be configured by a member (for example, a capacitor) having a function different from that of a semiconductor chip. In addition, one semiconductor chip may be configured to realize a function of the processor and another function.

Summary of One Embodiment of Present Disclosure

This way, the power transmission device 100 transmits power to the underwater vehicle 60 including the power reception coil CLB underwater. The power transmission device 100 includes: the power transmission coil CLA that transmits power to the power reception coil CLB through a magnetic field, a power transmission unit that transmits an alternating current voltage having a frequency of 10 kHz or lower to the power transmission coil CLA, and a first capacitor. The first capacitor is connected to the power transmission coil CLA and forms the resonance circuit 152 resonating at the frequency with the power transmission coil CLA. The power transmission unit is, for example, the driver 151. The first capacitor is, for example, the capacitor CA.

As a result, it is not necessary that the underwater vehicle 60 move to the vicinity of the power transmission device 100 when receiving power supply. Therefore, the underwater vehicle 60 can receive power supply while performing an operation such as data collection. Accordingly, the power transmission device 100 can improve the operating rate of the underwater vehicle 60 during power feeding, and can improve the efficiency of the operation of the underwater vehicle 60 such as underwater data collection. In addition, the frequency of the alternating current voltage applied to the power transmission coil CLA is 10 kHz or lower. Therefore, in a region of about half of the diameter of the power transmission coil CLA from the power transmission coil CLA, a desired magnetic field intensity can be maintained. Accordingly, the wireless power transmission to the underwater vehicle 60 moving undersea can be efficiently performed.

In addition, the power transmission device 100 may include: at least one repeating coil CLC that transmits power to the power reception coil CLB using a magnetic field generated from the power transmission coil CLA, at least one second capacitor, and the connector 30 that connects the power transmission coil CLA and the repeating coil CLC to each other. The second capacitor is connected to the repeating coil CLC and forms a resonance circuit resonating at the frequency with the repeating coil CLC. The second capacitor is, for example, the capacitor CC.

As a result, the power transmission device 100 can expand the power transmission distance using the repeating coil CLC. In addition, the power transmission device 100 can restrict the movement of the respective coils CL using the connector 30 and can improve the resonance efficiency of the resonance circuit. Therefore, the power transmission efficiency can be improved. Accordingly, even in a case where a water current is generated underwater, the power transmission device 100 can suppress a decrease in the charging efficiency of the underwater vehicle 60.

In addition, the power transmission coil CLA may transmit power in a direction substantially perpendicular to the water surface 90.

As a result, the power transmission device 100 can expand the power transmission distance in the depth direction, can supply power to the underwater vehicle 60 positioned at a deep water position (deep sea), and can improve the operation efficiency of the underwater vehicle 60.

In addition, the power transmission coil CLA may not only transmit the power but also data.

As a result, the underwater vehicle 60 can be charged using power supplied from the power transmission device 100 while suppressing a decrease in the efficiency of an operation such as data collection, and the power transmission device 100 can communicate data with the underwater vehicle 60.

In addition, the power transmission device 100 may include the reflection coil CLR that reflects a magnetic field generated from the power transmission coil CLA to the water bottom 95.

As a result, the power transmission device 100 can suppress the emission of the magnetic field, emitted from the power transmission coil CLA, to the water surface 90, and can suppress an interference between the magnetic field emitted from the power transmission coil CLA and communication in a very low frequency band or an ultra low frequency band over or under the water.

The present invention has been described in detail with reference to the specific embodiments. However, it is obvious to those skilled in the art that various changes and modifications can be made within a range not departing from the spirit and scope of the present invention.

The present application is based on Japanese Patent Application No. 2015-144090, filed on Jul. 21, 2015, the content of which is incorporated herein by reference.

INDUSTRIAL APPLICABILITY

The present disclosure is useful for a power transmission device or the like that can improve the operating rate of an underwater vehicle during power feeding.

REFERENCE SIGNS LIST 10, 400: POWER TRANSMISSION SYSTEM
20: ELECTRICAL WIRE
30: CONNECTOR
40: WEIGHT
45: BUOY
50: SHIP
60: UNDERWATER VEHICLE
70: SUBMARINE
80: UNDERWATER EXCAVATOR
90: WATER SURFACE
95: WATER BOTTOM
100: POWER TRANSMISSION DEVICE
110: POWER SUPPLY
120: ADC
130: CPU
140: INFORMATION COMMUNICATION UNIT
141: MODULATION/DEMODULATION CIRCUIT
151: DRIVER
152: RESONANCE CIRCUIT
200: POWER RECEIVING DEVICE
210: POWER RECEPTION CIRCUIT
211: RECTIFIER CIRCUIT
212: REGULATOR
220: CPU
230: CHARGING CONTROL CIRCUIT
240: SECONDARY BATTERY
250: INFORMATION COMMUNICATION UNIT
251: MODULATION/DEMODULATION CIRCUIT
300, 500, 600: SIMULATION MODEL
310, 510, 610: ANALYSIS AREA
CL: COIL
CLA: POWER TRANSMISSION COIL
CLB: POWER RECEPTION COIL
CLC, CLC1, CLC2, CLC3: REPEATING COIL
CLR, CLR1, CLR2: REFLECTION COIL
CA, CB, CC: CAPACITOR

The invention claimed is:

1. A power transmission device configured to transmit power underwater to an underwater vehicle having a power reception coil, the power transmission device comprising:
a power transmission coil configured to transmit power to the power reception coil through a magnetic field;
a power transmission unit configured to transmit an alternating current voltage having a frequency of 10 kilohertz (kHz) or lower to the power transmission coil;
a first capacitor connected to the power transmission coil and configured to form a resonance circuit resonating at the frequency with the power transmission coil;
at least one repeating coil configured to transmit power to the power reception coil using the magnetic field generated from the power transmission coil;
at least one second capacitor connected to the at least one repeating coil and configured to form a resonance circuit resonating at the frequency with the at least one repeating coil;
a connector disposed underwater and configured to connect the power transmission coil and the at least one repeating coil to each other with a gap; and another connector configured to connect the at least one repeating coil to each other with a gap, wherein the at least one repeating coil are disposed substantially parallel to each other, and more than half of opening surfaces formed by the at least one repeating coil overlap to each other.

2. The power transmission device according to claim 1, wherein the power transmission coil is disposed underwater, the power transmission device further comprising:
an electrical wire that connects the power transmission coil and the power transmission unit through a connecting device.

3. The power transmission device according to claim 1, wherein a distance of the gap between the at least one repeating coil is greater than or equal to a radius of each of the at least one repeating coil.

4. The power transmission device according to claim 1, wherein the power transmission coil is configured to transmit power in a direction substantially perpendicular to a water surface.

5. The power transmission device according to claim 4, further comprising:
a reflection coil configured to reflect a magnetic field generated from the power transmission coil to a water bottom.

6. The power transmission device according to claim 5, wherein the reflection coil is provided between the power transmission coil and the water surface.

7. The power transmission device according to claim 1, wherein the power transmission coil is configured to transmit power in a direction along a water surface or a water bottom.

8. The power transmission device according to claim 1, wherein the power transmission coil is configured to transmit data in addition to the power.

9. A power transmission device configured to transmit power underwater to an underwater vehicle having a power reception coil, the power transmission device comprising:
a power transmission coil configured to transmit power to the power reception coil through a magnetic field;
a power transmission unit configured to transmit an alternating current voltage having a frequency of 10 kilohertz (kHz) or lower to the power transmission coil;
a first capacitor connected to the power transmission coil and configured to form a resonance circuit resonating at the frequency with the power transmission coil;
at least one repeating coil configured to transmit power to the power reception coil using the magnetic field generated from the power transmission coil;
at least one second capacitor connected to the at least one repeating coil and configured to form a resonance circuit resonating at the frequency with the at least one repeating coil;
a connector disposed underwater and configured to connect the power transmission coil and the at least one repeating coil to each other with a gap; and
another connector configured to connect the at least one repeating coil to each other with a gap, wherein a distance of the gap between the at least one repeating coil is greater than or equal to a radius of each of the at least one repeating coil.

10. The power transmission device according to claim 9, wherein the power transmission coil is disposed underwater, the power transmission device further comprising:
an electrical wire that connects the power transmission coil and the power transmission unit through a connecting device.

* * * * *